(12) United States Patent
Kerschgens et al.

(10) Patent No.: US 10,239,767 B2
(45) Date of Patent: Mar. 26, 2019

(54) SOLAR THERMAL DEVICE FOR THE TREATMENT OF DRINKING WATER

(71) Applicants: Daniel Kerschgens, Vienna (AT); Heinz Georg Russwurm, Vienna (AT)

(72) Inventors: Daniel Kerschgens, Vienna (AT); Heinz Georg Russwurm, Vienna (AT)

(*) Notice: Subject to any disclaimer, the term of this patent is extended or adjusted under 35 U.S.C. 154(b) by 181 days.

(21) Appl. No.: 15/510,428

(22) PCT Filed: Sep. 9, 2015

(86) PCT No.: PCT/EP2015/070576
§ 371 (c)(1),
(2) Date: Mar. 10, 2017

(87) PCT Pub. No.: WO2016/038075
PCT Pub. Date: Mar. 17, 2016

(65) Prior Publication Data
US 2017/0283277 A1     Oct. 5, 2017

(30) Foreign Application Priority Data

Sep. 10, 2014   (AT) .............................. A 50628/2014

(51) Int. Cl.
*C02F 1/18* (2006.01)
*C02F 1/14* (2006.01)
(Continued)

(52) U.S. Cl.
CPC .............. *C02F 1/18* (2013.01); *B01D 1/0035* (2013.01); *B01D 5/006* (2013.01); *B01D 5/0066* (2013.01);
(Continued)

(58) Field of Classification Search
CPC ... C02F 1/048; C02F 1/14; C02F 1/18; B01D 5/006; B01D 5/0035; B01D 5/0066; Y02W 10/37
See application file for complete search history.

(56) References Cited

U.S. PATENT DOCUMENTS 3,415,719 A    12/1968 Telkes

FOREIGN PATENT DOCUMENTS

| AT | 509172 | 6/2011 |
|---|---|---|
| DE | 19815541 | 12/1999 |

(Continued)

OTHER PUBLICATIONS

English Abstract of DE 19815541.
English Abstract of DE 102011101951.

*Primary Examiner* — Brian A McCaig
(74) *Attorney, Agent, or Firm* — Dykema Gossett PLLC

(57) ABSTRACT

The invention relates to a portable, solar-thermal device for the treatment of drinking water from waste water, comprising an evaporation container that accommodates the waste water, a condensation apparatus having a flow connection to the evaporation container, and a separator arranged between the evaporation container and the condensation apparatus for separating and leading away the condensate obtained in the condensation apparatus. According to the invention, the separator has passage openings for the transfer of water vapor into the condensation apparatus, which is arranged on the top side of the device in the operating position of the device, and a drain opening for the condensate arising in the condensation apparatus, which drain opening can be connected to a collecting container, wherein the evaporation container, which is arranged on the bottom side of the separator, is designed as a flexible film bag.

12 Claims, 4 Drawing Sheets

(51) Int. Cl.
*B01D 5/00* (2006.01)
*C02F 1/04* (2006.01)
*B01D 1/00* (2006.01)

(52) U.S. Cl.
CPC ............... *C02F 1/048* (2013.01); *C02F 1/14* (2013.01); *C02F 2201/004* (2013.01); *C02F 2201/008* (2013.01); *Y02A 20/109* (2018.01); *Y02A 20/211* (2018.01); *Y02A 20/212* (2018.01); *Y02A 20/214* (2018.01); *Y02W 10/37* (2015.05)

(56) References Cited

FOREIGN PATENT DOCUMENTS

| | | | |
|---|---|---|---|
| DE | 102011101951 | 11/2012 | |
| FR | 1350450 | 12/1963 | |
| GB | 2481708 | 1/2012 | |
| WO | 2008151350 | 12/2008 | |
| WO | WO 2008/151350 A1 * | 12/2008 | ................ C02F 1/10 |

* cited by examiner

SOLAR THERMAL DEVICE FOR THE TREATMENT OF DRINKING WATER

The invention relates to a portable, solar thermal apparatus for the treatment of drinking water from waste water, comprising an evaporation container that accommodates the waste water, a condensation device having a flow connection to the evaporation container, and a separator arranged between the evaporation container and the condensation device for separating and leading away the condensate obtained in the condensation device.

Apparatuses and auxiliary means are required for purifying contaminated water for the purpose of supply and provision in disaster areas such as earthquake areas and in areas with a critical supply of drinking water, e.g. in order to produce drinking water from waste water or fresh water from salt water. Waste water shall be understood below as contaminated water, rainwater and also salt water.

DE 198 15 541 C1 describes in this context a transportable distilling device which is formed as a film tunnel consisting of a semicylindrical top film and a flat bottom film. Tubular pressure chambers are formed between the top film and the flat bottom film on both sides, which pressure chambers are formed integrally with the top film. The storage area for seawater is spatially separated by the pressure chambers from the upper evaporation area, and the entire apparatus, which is sealed at the front and the rear by semicircular wall sections, is mechanically stabilised. The evaporation and condensation chamber, through the transparent surface of which the sunlight can penetrate, is subjected to an overpressure. During the operation of the distillation device, the water situated in the storage area is evaporated by the thermal action from the outside. The water vapour thus produced rises up and condenses on the top film, wherein the condensate flows off to the left and right and is collected in a condensation area which is formed between the top film and the tubular pressure chambers. The fresh water can be taken from these areas via a drain.

A portable, solar thermal apparatus for water treatment is known from AT 509 172 A1, which substantially consists of the following parts:
  a waste water vessel accommodating the contaminated water and having a cylindrical connecting region (e.g. the bottom region of a PET bottle),
  a condensation vessel forming the condensation region and having a cylindrical connecting region (e.g. the upper region of a PET bottle), and
  an adapter having a first and a second receiving flange for fastening the cylindrical connecting regions of the waste water vessel on the one hand and the condensation vessel on the other hand, wherein the adapter is used as a separator for the obtained condensate and comprises a collecting groove provided with a discharge line.

The waste water vessel and the condensation vessel of the apparatus can be made of the two parts of a water bottle (e.g. a conventional three-liter, five-liter or eight-liter drinking water bottle) which is cut open in the bottom third and which after cutting merely need to be fastened to the two receiving flanges of the adapter, for which purpose an adhesive strip can be used. The original shape of a bottle can now be recognised again after the joining of the two parts, wherein the inserted adapter or separator with the inner collecting groove is now only situated in the bottom third. Only a certain amount of effort in the production and sealing of the water treatment system and the collection of the treated water is disadvantageous.

It is the object of the invention to improve a portable, solar thermal apparatus for producing fresh water or for water treatment in such a way that it is easy to produce and is rapidly available when needed. Furthermore, the apparatus shall allow compact storage and availability and achieve an improved yield of fresh water.

This object is achieved in accordance with the invention in such a way that the separator comprises passage openings for the transfer of water vapour into the condensation device, which is arranged on the top side of the apparatus in the operating position thereof, and a separate drain opening for the condensate obtained in the condensation device, which drain opening can be connected to a collecting container (preferably a PET bottle), wherein the evaporation container which is arranged on the bottom side of the separator is formed as a flexible film bag. The apparatus is oriented substantially perpendicularly in the operating position, wherein the collecting container stands on the ground or is preferably partly dug in. The flexible film bag expounds after filling in the waste water and offers the incident solar radiation an enlarged, absorbent surface.

In accordance with the invention, the condensation device is formed as a folding container with a large surface area, which after its unfolding forms cooling rib structure with a preferably white outer surface, whose inner surface is used as a condensation area.

The apparatus can be present in accordance with the invention as a packaging or sales unit, which comprises at least one plastic bottle, preferably a conventional PET bottle filled with water or the like, and an additional container which can be fastened to the base of the PET bottle, wherein the separator plus the folded condensation device and the folded, flexible film bag are arranged in the additional container.

Once the content of the beverage or water bottle has been consumed, the bottle can be used by means of the components, which are present in the additional container in compact form, with few manipulations and without the use of tools within the terms of the invention as a water treatment system.

The invention will be explained below in closer detail by reference to illustrations of an exemplary embodiment, wherein.

Figure 1:
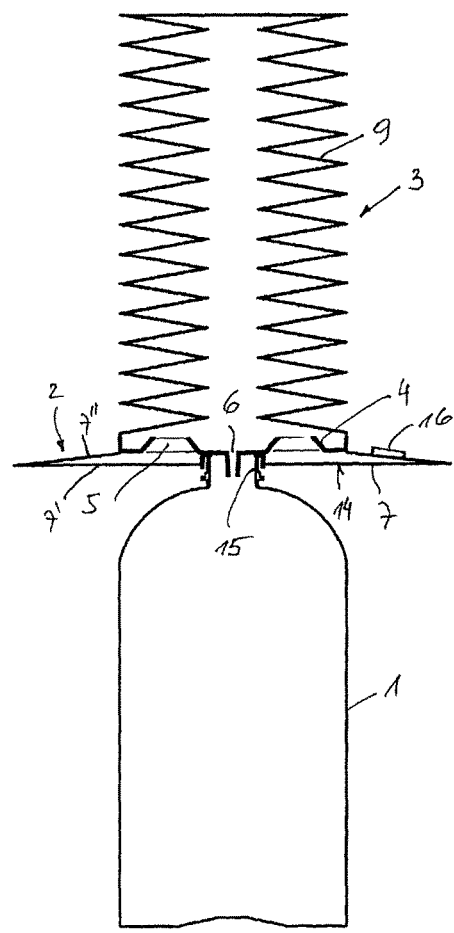
FIG. 1 shows a sectional view of a solar thermal apparatus in accordance with the invention for water treatment in the operating position of the apparatus.
Figure 2:
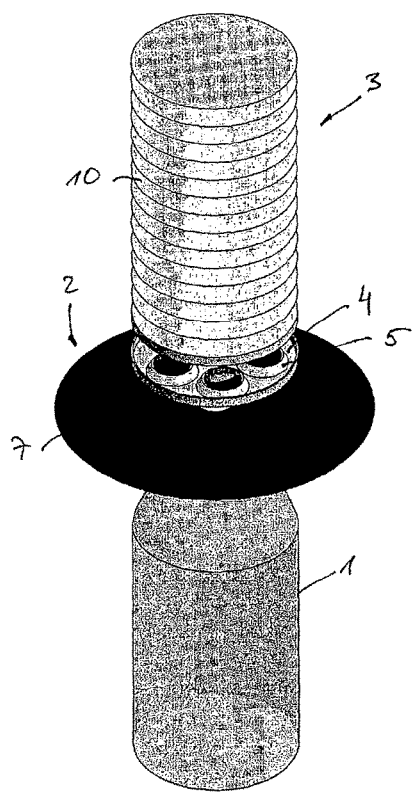
FIG. 2 shows the solar thermal apparatus according to FIG. 1 in a three-dimensional exploded view.

The embodiment of a solar thermal apparatus for water treatment as shown in FIG. 1 to FIG. 8 substantially consists of an evaporation container 2 which accommodates the waste water and an unfoldable condensation device 3 which is connected thereto by means of a separator 4 and which can be fastened with the separator 4 to a collecting container 1 (e.g. a conventional empty PET bottle) for accommodating the obtained drinking water.

The separator 4 comprises passage openings 5 for the transfer of water vapour into the condensation device 3 which is arranged on its upper side in the operating position of the apparatus and a drain opening 6 for the condensate obtained in the condensation device 3, wherein the drain opening 6 can be connected to the screw connection 15 of the collecting container or the PET bottle 1. The evaporation container 2 which is arranged on the bottom side of the separating wall 4 is formed as a flexible film bag 7 whose closable filling opening is indicated with 16.

Figure 8:
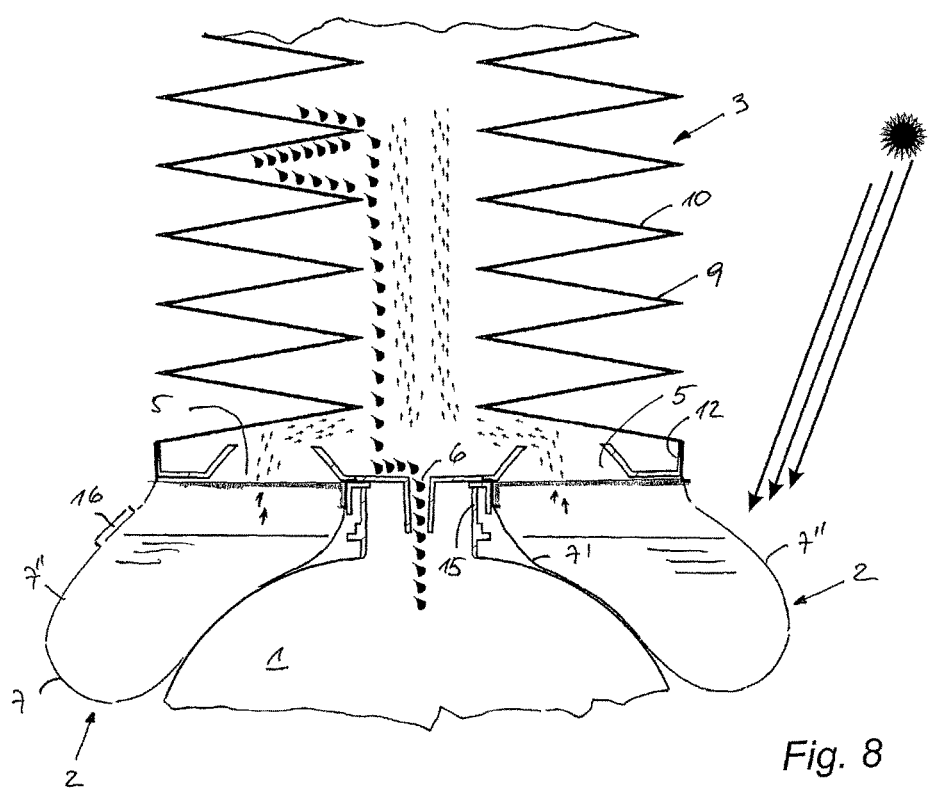
FIG. 8 shows a functional principle of the solar thermal apparatus in a sectional view.

The flexible film bag 7 unfolds after filling with waste water and can then rest on the collecting container 1 for example (see FIG. 8). If the collecting container is dug in at least partly for improving the stability, the flexible film bag 7 can also rest on the ground and can be heated there in addition.

The condensation device 3 is formed as a folding container 9 of a large surface area in accordance with the invention, which after its unfolding forms a cooling rib structure 10 whose inner surface is used as a condensation region (see FIG. 8).

For the purpose of improving the evaporation performance, the flexible film bag 7 can comprise an inner film 7' which is dyed in dark or in black (rests after filling on the PET bottle 1 or the ground) and a transparent outer film 7" which is welded thereto at the edge in order to increase the fraction of solar radiation which enters the film bag 7. Furthermore, the thermal efficiency can be increased if the inner foil 7' of the flexible film bag 7 comprises a thermal insulation layer 14.

Figure 4:
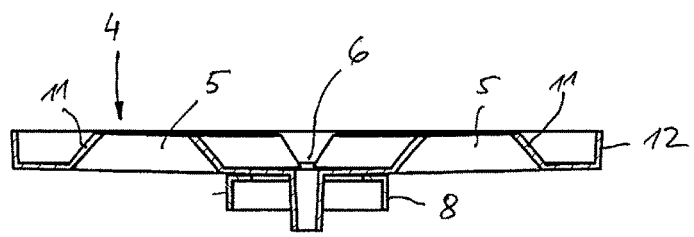
FIG. 4 shows the separator of the solar thermal apparatus in a sectional view.
Figure 5:
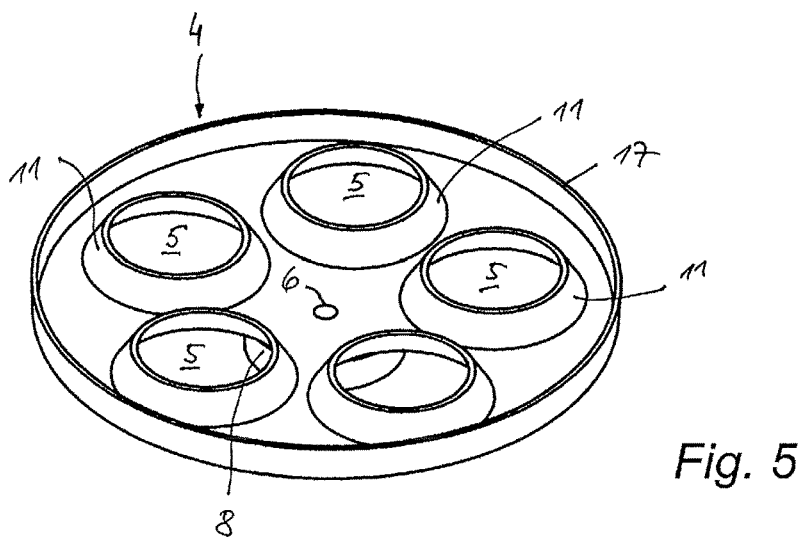
FIG. 5 shows the separator of the solar thermal apparatus in a three-dimensional view.
Figure 6:
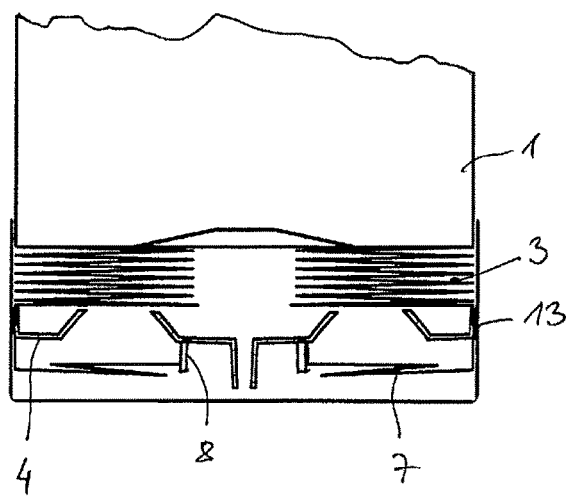
FIG. 6 shows a packaging unit of the solar thermal apparatus in a sectional view.

In accordance with the invention, the separator 4 comprises an adapter 8 at the drain opening 6 with a screw thread, with which it can be fastened to the screw connection 15 of the collecting container 1, preferably a PET bottle (see FIG. 4 and FIG. 5). The passage openings 5 of the separator 4 are arranged in a substantially circular manner around the drain opening 6 in the illustrated example and preferably comprise a conically tapering collar 11.

Figure 3:
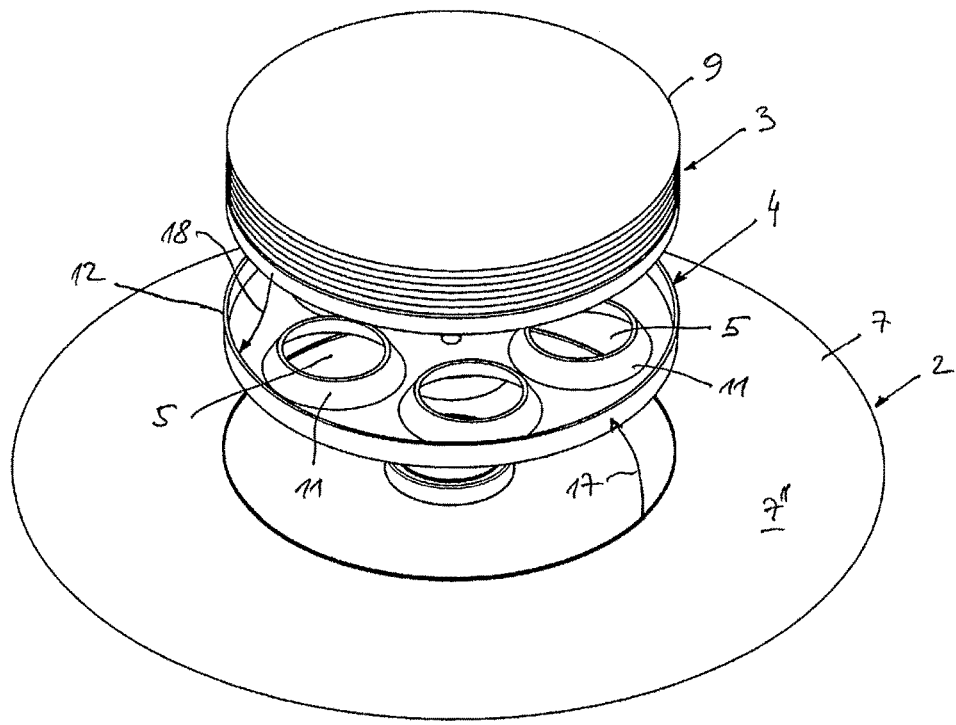
FIG. 3 shows a detail of the apparatus according to FIG. 2 with a folded condensation device.

Furthermore, the separator 4 comprises an outer flange region 12 to which the flexible film bag 7 is fastened with its inner edge (see arrow 17 in FIG. 3) on the one hand and to the folding container 9 of the condensation device 3 on the other hand (see arrow 18 in FIG. 3).

The apparatus in accordance with the invention for water treatment can be present as a packaging or sales unit. For this purpose, the apparatus comprises an additional container 13 which can be fastened and preferably attached to the base of the collecting container 1, e.g. a PET bottle, wherein the separator 4 plus the folded condensation device 3 and the folded flexible film bag 7 are arranged in the additional container 13 (see FIG. 7).

Figure 7:
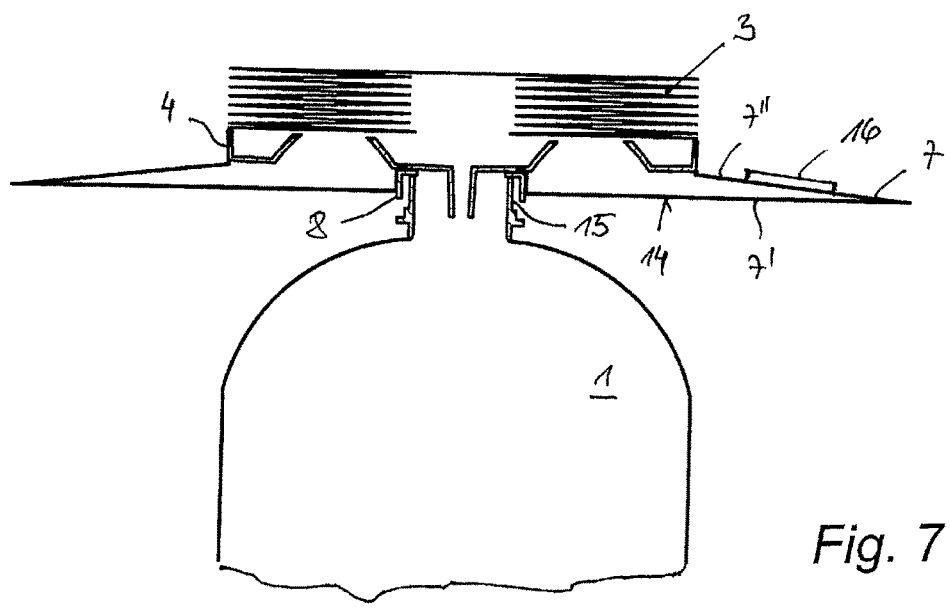
FIG. 7 shows a detail of the apparatus according to FIG. 1 with folded condensation device.

After the removal of the folded apparatus from the additional container 13, the adapter 8 of the separator 4 can be screwed onto the screw connection 15 of the PET bottle 1, so that the situation shown in FIG. 7 is obtained prior to the filling of the flexible film bag 7 with waste water and prior to the unfolding of the condensation device 3.

After the filling of the flexible film bag 7 with waste water the folding container 9 is unfolded, which can be supported by an integrated coil spring made of metal or hard plastic. It is also possible to select a folding container 9 which is present in the additional container 13 in a pre-tensioned manner and automatically unfolds after the removal.

Furthermore, the packaging unit can contain means in order to further increase the evaporation rate in the film bag 7. The additional container 13 can contain potassium permanganate for example in order to provide a dark colour to the waste water in the flexible film bag 7.

The function of the apparatus in accordance with the invention is shown in closer detail in FIG. 8. In order to clean the contaminated water or waste water, the system must be placed in the sun. The sunbeams impinge on the absorbing evaporation container 2 (flexible bag 7) and heat the waste water. The evaporating water now rises through the round passage openings 5 of the separator 4 into the upper region. In the condensation device 3, which comprises a cooling rib structure 10 and preferably a white reflective surface, the temperature is considerably lower than in the evaporation container 2. Upon reaching the dew point, the evaporated water now condensates on the inner surface of the folding container 9 and drips onto the middle region of the separator 4. The condensated and thus purified water flows from there through a small drain opening 6 into the empty PET bottle 1.

The invention claimed is:

1. A portable solar thermal apparatus for the treatment of drinking water from waste water, comprising an evaporation container that accommodates the waste water, a condensation device having a flow connection with said evaporation container, and a separator arranged between the evaporation container and the condensation device for separating and leading away the condensate obtained in the condensation device, wherein the separator comprises passage openings for the transfer of water vapour into the condensation device, which is arranged on the top side of the apparatus in the operating position thereof, and a drain opening for the condensate obtained in the condensation device, which drain opening can be connected to a collecting container, wherein the evaporation container which is arranged on the bottom side of the separator is formed as a flexible film bag.

2. The solar thermal apparatus according to claim 1, wherein the condensation device is formed as a folding container with expandable surface area, which after its unfolding forms a cooling rib structure whose inner surface is used as a condensation region.

3. The solar thermal apparatus according to claim 1, wherein the flexible film bag is configured and arranged to unfold after filling with waste water and is supported on the collecting container.

4. The solar thermal apparatus according to claim 1, wherein the flexible film bag comprises an inner film which is dyed in dark or in black and a transparent outer film which is welded thereto at the edge side.

5. The solar thermal apparatus according to claim 4, wherein the inner film of the flexible film bag comprises a thermal insulation layer.

6. The solar thermal apparatus according to claim 1, wherein the separator comprises an adapter with a screw thread on the drain opening, with which it can be fastened to the screw connection of the collecting container.

7. The solar thermal apparatus according to claim 1, wherein the passage openings of the separator are arranged in a substantially circular manner around the drain opening and comprise a conically tapering collar.

8. The solar thermal apparatus according to claim 1, wherein the separator comprises an outer flange region, the flexible film bag and the folding container of the condensation device are fastened to the outer flange region of the separator.

9. The solar thermal apparatus according to claim 1, wherein the apparatus comprises an additional container which can be fastened, preferably attached, to the base of the collecting container, wherein the separator plus the folded condensation device and the folded flexible film bag are arranged in the additional container.

10. The solar thermal apparatus according to claim 9, wherein the additional container contains a means such as potassium permanganate in order to colour the waste water dark in the flexible film bag.

11. The solar thermal apparatus according to claim 6, wherein the collecting container is a PET bottle.

12. The solar thermal apparatus according to claim 9, wherein the collecting container is a PET bottle.

\* \* \* \* \*